(12) United States Patent
Nishide

(10) Patent No.: US 6,878,001 B2
(45) Date of Patent: Apr. 12, 2005

(54) CONNECTOR ASSEMBLING CONSTRUCTION AND ASSEMBLING METHOD

(75) Inventor: Satoru Nishide, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 10/669,448

(22) Filed: Sep. 23, 2003

(65) Prior Publication Data

US 2004/0058574 A1 Mar. 25, 2004

(30) Foreign Application Priority Data

Sep. 24, 2002 (JP) ........................................ 2002-277510

(51) Int. Cl.⁷ ............................................. H01R 13/62
(52) U.S. Cl. ..................................................... 439/157
(58) Field of Search .............................. 439/157, 347, 439/310, 248, 247, 376, 342, 567, 701, 377

(56) References Cited

U.S. PATENT DOCUMENTS

| 5,667,398 A | 9/1997 | Kidd et al. | |
|---|---|---|---|
| 6,217,363 B1 | 4/2001 | Takata | |
| 6,428,340 B2 * | 8/2002 | Okabe et al. | 439/347 |
| 6,435,897 B1 * | 8/2002 | Paul et al. | 439/374 |

FOREIGN PATENT DOCUMENTS

JP 2001-150979 6/2001

* cited by examiner

Primary Examiner—Ross Gushi
Assistant Examiner—Phuongchi Nguyen
(74) Attorney, Agent, or Firm—Gerald E. Hespos; Anthony J. Casella

(57) ABSTRACT

A module (M) is assembled with a body (B) by being moved substantially horizontally and then being displaced down by guidance of a guiding means (10) to connect the moving-side connector (20) with a waiting-side connector (40). The weight of the module (M) generates a connecting force when the connectors (20, 40) are connected. Thus, the module (M) can be assembled easily with the body (B) and to connect the two connectors (20, 40) even if a large connection resistance is created between the two connectors (20, 40).

10 Claims, 10 Drawing Sheets

CONNECTOR ASSEMBLING CONSTRUCTION AND ASSEMBLING METHOD

BACKGROUND OF THE INVENTION

1. Field of the Invention

The invention relates to a connector mounting construction to enable connection of a module-side connector and a body-side connector.

2. Description of the Related Art

Japanese Unexamined Patent Publication No. 2001-150979 discloses a construction for connecting a moving-side connector and a waiting side connector. The moving side connector may be on a module, such as an instrument panel of an automotive vehicle. The waiting-side connector may be on the body as the module is assembled. The construction is intended to reduce the number of operation steps.

The module is guided substantially horizontally toward the body in response to a pushing force by an operator. Thus, the moving-side connector of the module is connected in a substantially horizontal direction with the waiting-side connector of the body.

Resistance is created when connectors are mated due to friction between the terminal fittings in the connectors. Such connection resistance acts as a reaction force against the horizontal movement of the module. Therefore, it has been difficult to push the module and an improvement has been hoped for.

The present invention was developed in view of the above problem and an object thereof is to improve operability in connecting connectors as a module is assembled with a body while being manually moved horizontally.

SUMMARY OF THE INVENTION

The invention relates to a connector assembling construction for connecting a moving-side connector and a waiting side connector. The moving-side connector may be on or in a module, such as an instrument panel of an automotive vehicle, and the waiting-side connector may be on the body of an automotive vehicle. The moving-side connector is mounted on the module so that a connecting surface of the moving-side connector has a normal vector inclined down by less than about 20° with respect to a vertical direction. The waiting-side connector is mounted on the body so that a connecting surface of the waiting-side connector has a normal vector inclined up by less than about 20° with respect to a vertical direction. The module is displaced along the connecting direction to connect the moving-side connector with the waiting-side connector.

The weight of the module acts as a connecting force as the two connectors are being connected. Thus, the module can be assembled easily with the body to connect the two connectors even if a large connection resistance is created between the connectors. Accordingly, operability is good even if the module is moved manually.

A guiding means preferably is moved substantially horizontally and then down for guiding the module into assembly with the body.

At least one of the moving-side connector and the waiting-side connector may have a floating mechanism for enabling the respective connector to be displaced with respect to the module or the body in a direction intersecting the connecting direction of the connectors.

The two connectors may be displaced in a direction intersecting the connecting direction. However, such a displacement can be corrected by the floating mechanism. Thus, the connectors can be connected securely.

One of the moving-side connector and the waiting-side connector may include a receptacle into which the other connector can fit, and a slanted guide is formed near an opening edge of the receptacle. Thus, displacement in a direction intersecting the connecting direction can be corrected automatically by the slanted guide without a need to correct the positions of the connectors manually as the connection progresses. Thus, the connectors can be connected without any hindrance.

A cam means may be provided for assisting the connection of the moving-side connector and the waiting-side connector.

The invention also relates to a method for connecting a moving-side connector on a module, such as an instrument panel, and a waiting-side connector on a body, such as an automotive vehicle body. The method comprises mounting the moving-side connector of the module so that a connecting surface of the moving-side connector has a normal vector inclined up by less than about 20° with respect to a vertical direction. The method then includes mounting the waiting-side connector of the body so that a connecting surface of the waiting-side connector has a normal vector inclined up by less than about 20° with respect to the vertical direction. The method then displaces the module down along the connecting direction to connect the moving-side connector with the waiting-side connector.

The method may further comprise guiding the module substantially horizontally and then displacing the module down for connection.

Preferably, the method further comprises allowing at least one of the moving-side connector and the waiting-side connector to be displaced with respect to the module or the body in a direction intersecting a connecting direction of the two connectors.

One of the moving-side connector and the waiting-side connector preferably includes a receptacle into which the other connector can fit, and a slanted guiding portion may be formed near an opening edge of the receptacle.

The method preferably comprises assisting the connection of the moving-side connector and the waiting-side connector by a cam action.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
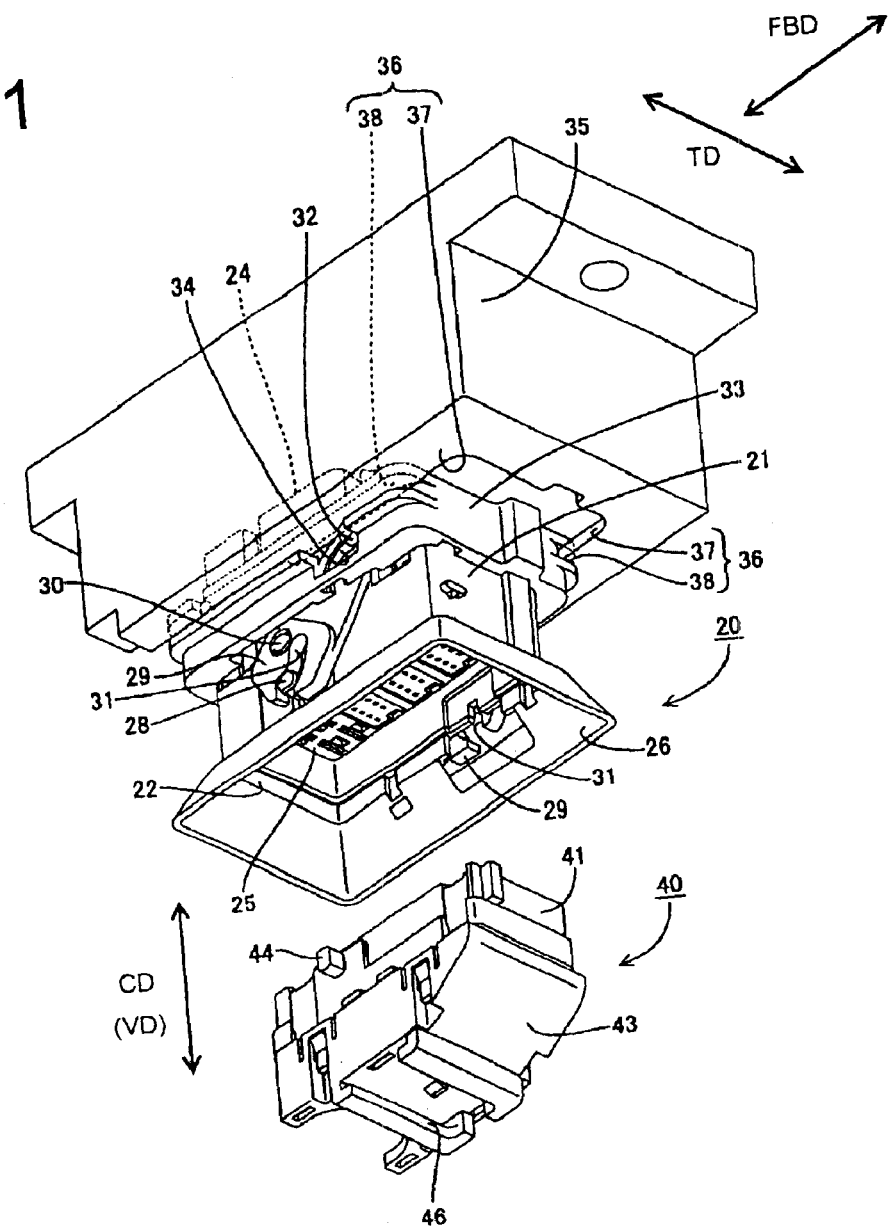
FIG. 1 is a perspective view showing a state before two connectors are connected in one embodiment of the invention.
Figure 2:
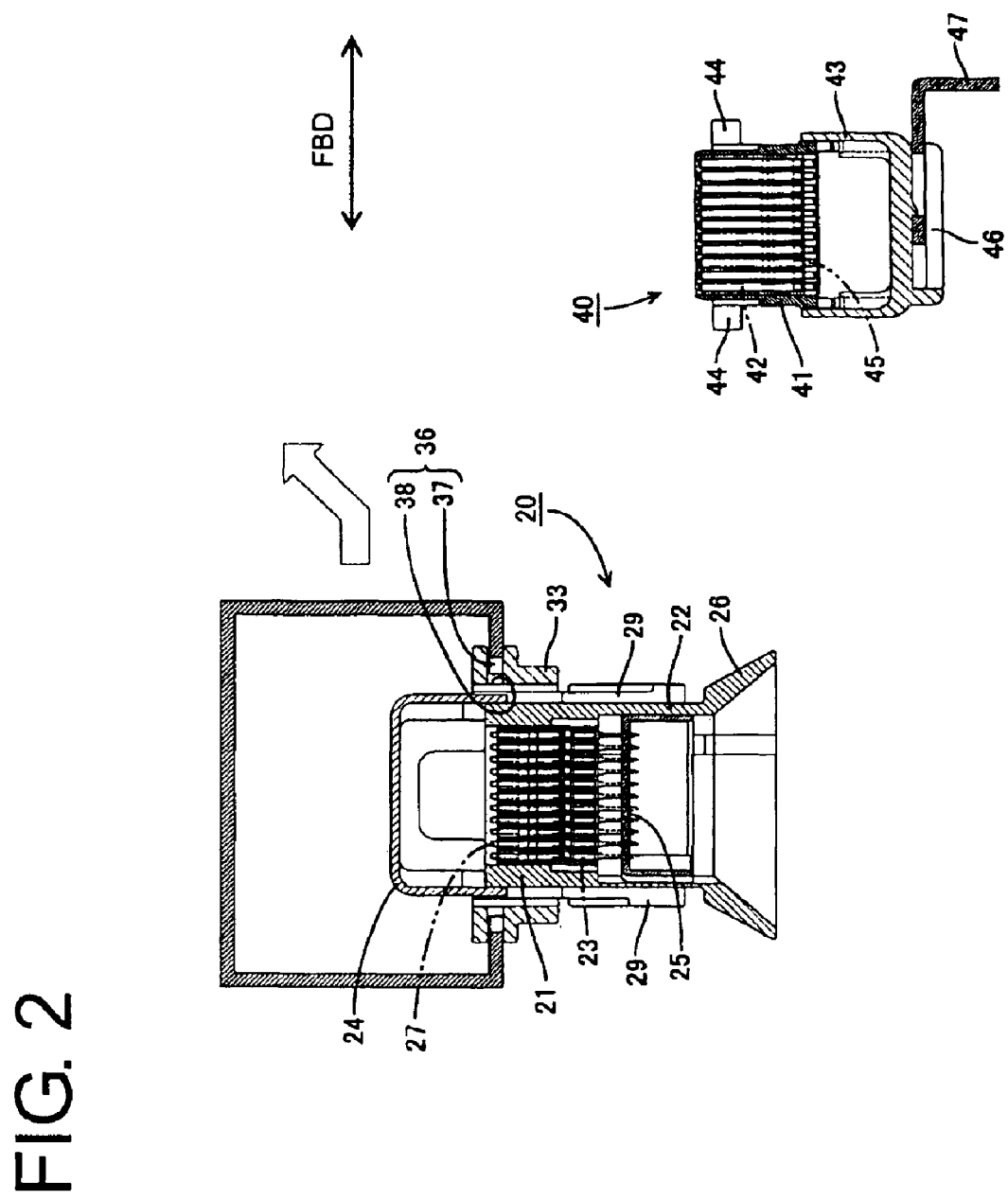
FIG. 2 is a section showing a state where a module and a moving-side connector are located at a position behind a waiting-side connector and shown in FIG. 7(*a*).
Figure 3:
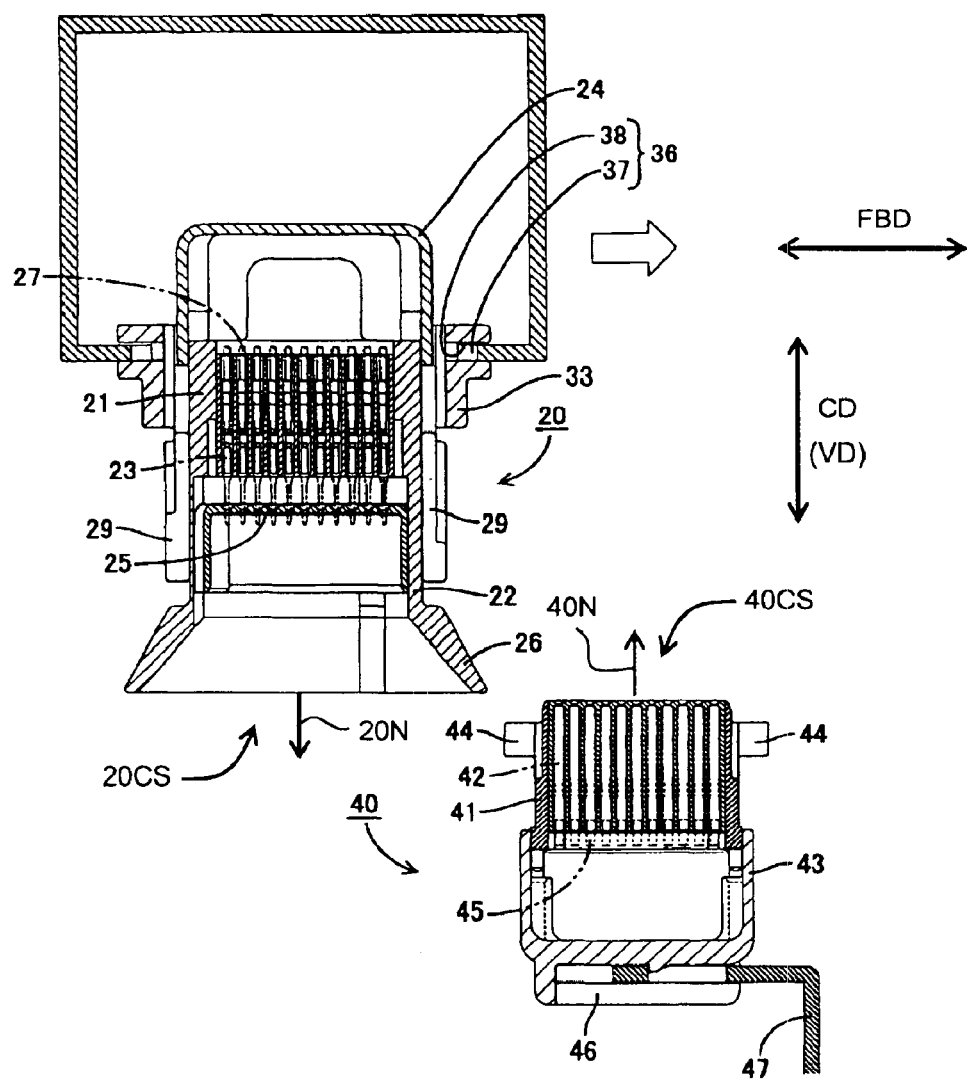
FIG. 3 is a section showing a state where the module and the moving-side connector are moved obliquely upward to the front from the position behind the waiting-side connector and shown in FIG. 7(*a*) to a position shown in FIG. 7(*b*).
Figure 4:
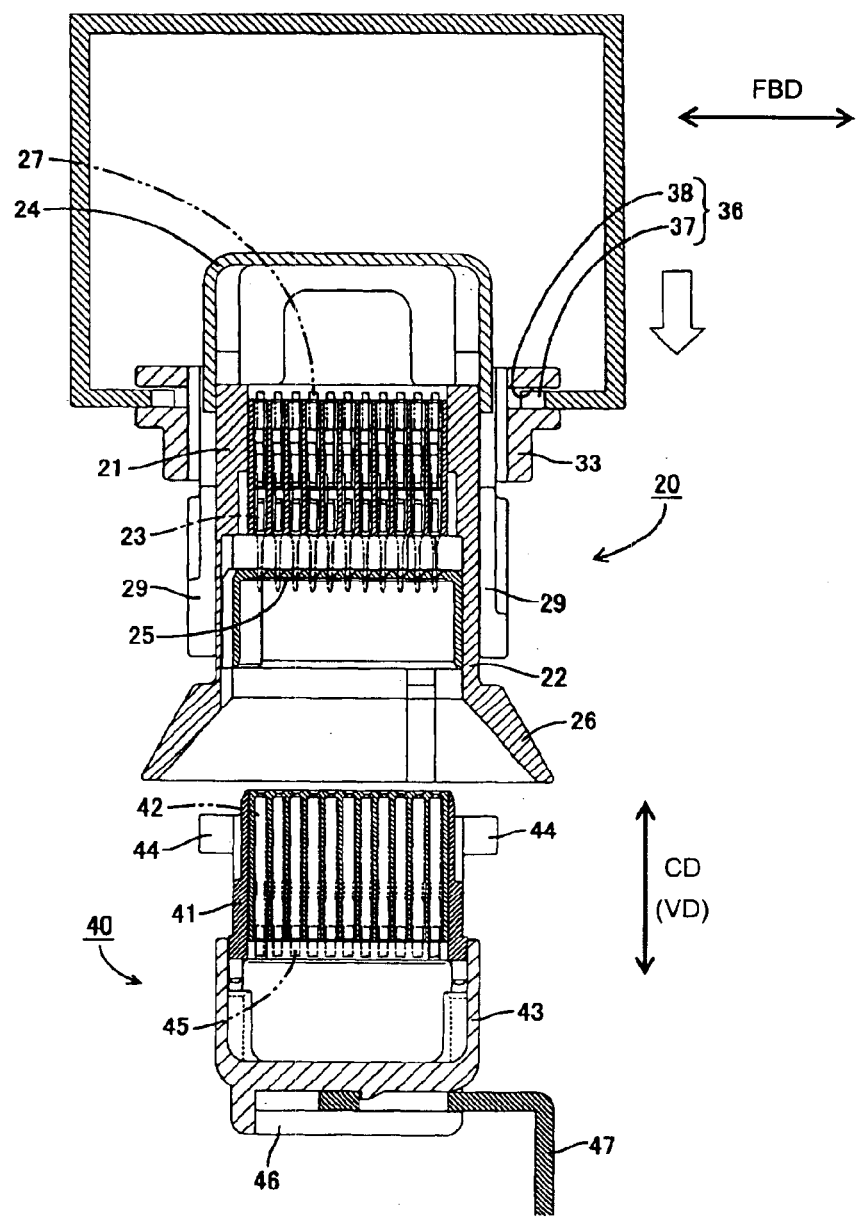
FIG. 4 is a section showing a state where the moving-side connector is at a position right above the waiting-side connector and shown in FIG. 7(*b*).
Figure 5:
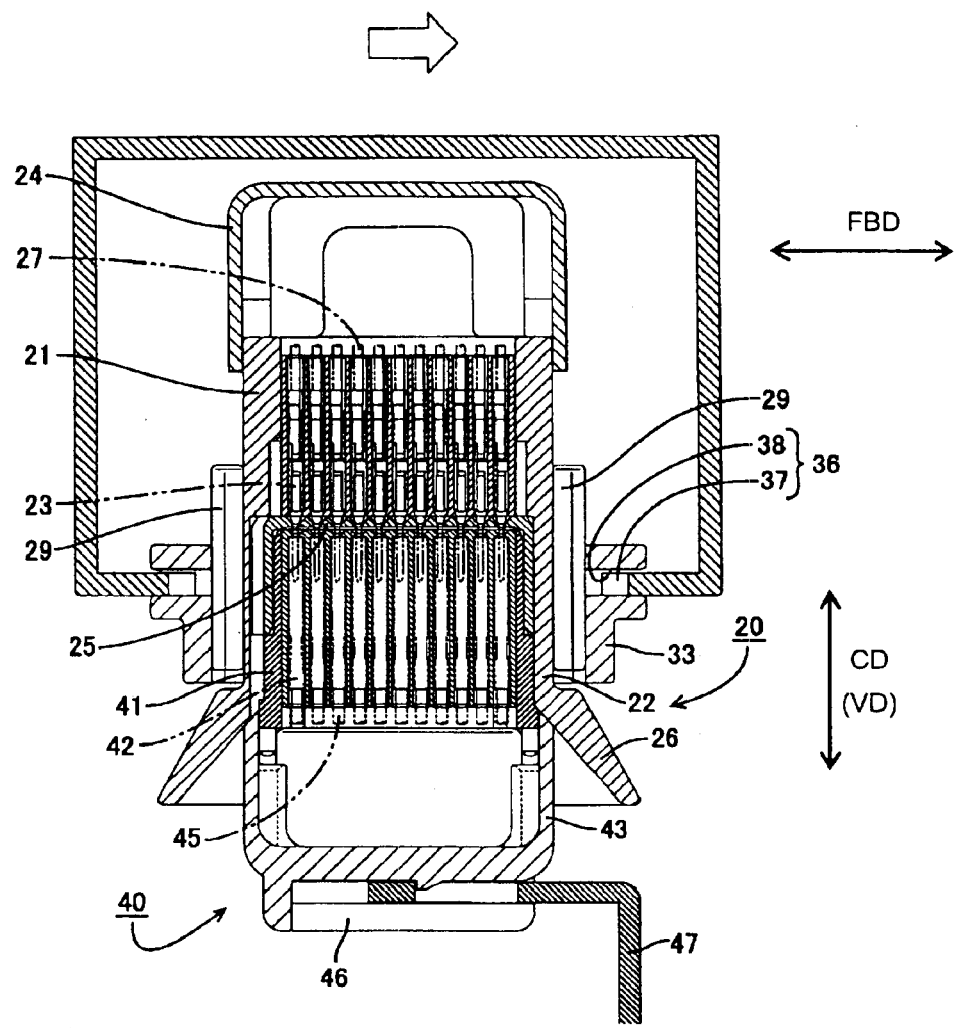
FIG. 5 is a section showing a state where the moving-side connector is connected with the waiting-side connector and at a position shown in FIG. 7(c).
Figure 6:
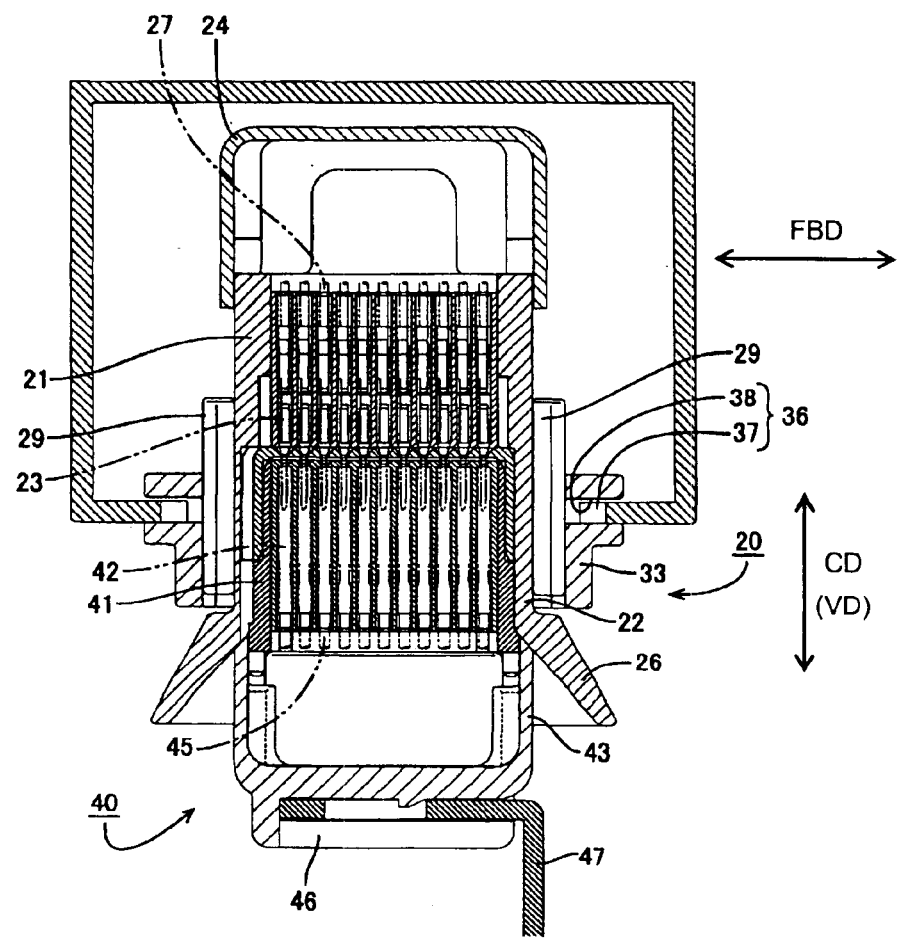
FIG. 6 is a section showing a state where the moving-side connector and the waiting-side connector are slid forward while being kept connected from the state shown in FIG. 5.

A moving-side connector according to the invention is identified by the numeral 20 in FIGS. 1 to 10, and is provided on a module M, such as an instrument. The moving-side connector 20 is connectable with a waiting-side connector 40 on a body B of an automotive vehicle as the module M is assembled with the body B. In the following description, the right side in FIGS. 2 to 7 is referred to as the front side concerning forward and backward directions FBD.

The module M is guided substantially horizontally by a guiding means 10 for assembly with the body B. The guiding means 10 includes guides 11 on the left and right surfaces of the module M and guide rails 12 on an unillustrated assembly line for the module M. As shown in FIG. 7, each guide rail 12 has a rear horizontal guide portion 13 that extends substantially straight and horizontal in forward and backward directions FBD. A slanted guide portion 14 slopes obliquely up and to the front from the front end of the rear horizontal guide portion 13, and thus extends away from the waiting-side connector 40 along a direction intersecting the forward and backward directions FBD. A front horizontal guide portion 15 extends substantially straight and horizontal in forward and backward directions FBD from the front end of the slanted guide portion 14. A downward guide 16 extends down toward the waiting-side connector 40 from the front end of the front horizontal guide portion 15. The guides 11 fit into the corresponding guide rails 12 and a manual pushing force moves the module M and the moving-side connector 20 forward along forward and backward directions FBD. The module M is suspended by an unillustrated crane and is detached from the crane after the module M is assembled with the body B and the moving-side connector 20 is connected with the waiting-side connector 40.

The moving-side connector is a male connector and has a housing 21 with a substantially rectangular receptacle 22 that is open forward toward the moving-side connector 20. Male terminal fittings 23 are insertable from behind into the housing 21 along an insertion direction. A wire cover 24 is mounted on the rear surface of the housing 21, and a moving plate 25 is provided in the receptacle 22 for movement forward and backward along a connection direction CD with the waiting side connector 40. The connection direction CD is substantially normal to the forward and backward direction FBD and substantially parallel to a vertical direction VD.

A guiding portion 26 is formed at the front opening edge of the receptacle 22 and is inclined with respect to the connecting direction CD to widen toward the front end. The slanted inner surface of the guiding portion 26 helps to correct displacement in a transverse direction between the moving side connector 20 and the waiting side connector 40 as explained herein. In this regard, the transverse direction TD is substantially normal to the forward and backward direction FBD and to the connecting direction CD.

Wires 27 are connected with the corresponding male terminal fittings 23 in the housing 21 and are drawn out upward through the rear surface of the housing 21. The wires 27 are bent substantially horizontally in the wire cover 24 and drawn out of the wire cover 24.

The moving plate 25 has a known construction with positioning holes for positioning tabs at the front ends of the male terminal fittings 23. Cam followers 28 are formed at the left and right edges of the moving plate 25 and are exposed at the outer surface of the receptacle 22.

The moving-side connector 20 is mounted in a frame 33 via front and rear levers 29. The levers 29 are substantially flat and are supported rotatably on supporting shafts 30 on the front and rear surfaces of the housing 21. Each lever 29 has a cam groove 31 and a cam follower 32, and the cam followers 28 of the moving plate 25 engage the cam grooves 31. The frame 33 is substantially rectangular and surrounds the housing 21 at the front, rear, left and right sides. The cam followers 32 of the levers 29 engage front and rear cam grooves 34 in the frame 33. A distance from a center of rotation of the lever 29 to the cam follower 32 exceeds a maximum distance from the center of rotation of the lever 29 to the cam groove 31. Thus, the engagements of the cam followers 32 of the levers 29 and the cam grooves 34 of the frame 33 create large moments around the centers of rotation of the levers 29 when the housing 21 moves with respect to the frame 33 along a vertical direction VD or substantially along the connecting direction CD. As a result, large pushing/pulling forces act in the vertical direction VD or substantially along the connecting direction CD. These pushing forces are exerted on the cam followers 28 of the moving plate 25 and the cam followers 44 of the waiting-side connector 40 by the moment forces.

The moving-side connector 20 can be moved down along the connecting direction CD with respect to the frame 33. However, the cam followers 32 of the levers 29 catch in the cam grooves 34 of the frame 33 when the cam followers 28, 44 of the moving plate 25 and the waiting-side connector 40 reach the entrances of the cam grooves 31 of the levers 29. Thus, further downward movement of the moving-side connector 20 is prevented.

The frame 33 and the moving-side connector 20 are mounted in a holder 35 fixed to the module M for movement substantially along a transverse direction TD by a floating mechanism 36. The floating mechanism 36 includes a substantially rectangular opening formed in the bottom surface of the holder 35. Straight guide ribs 37 extend transversely at the front and rear edges of this opening, and straight guide grooves 38 extend transversely in the outer front and rear surfaces of the frame 33. The guide grooves 38 and the guide ribs 37 engage so that the frame 33 and the moving-side connector 20 can make transverse horizontal movements with respect to the holder 35 and the module M substantially along the forward and backward direction FBD and the transverse direction TD. In this way, the moving-side connector 20 can be mounted on the module M with the front connecting surface 20CS facing down toward the waiting-side connector 40.

The waiting-side connector 40 is a female connector, and has a substantially rectangular housing 41 configured to fit into the receptacle 22 of the moving-side connector 20 from below and substantially along the connecting direction CD. Female terminal fittings 42 are insertable into the housing 41 from below and along an inserting direction. A wire cover 43 is mounted on the bottom surface of the connector housing 41.

Two cam followers 44 project laterally from the left and right surfaces of the housing 41 and fit into recesses of the corresponding cam followers 28 of the moving plate 25. Thus, the cam followers 28, 44 engage as integral units with the cam grooves 31 of the levers 29. The waiting-side connector 40 and the moving plate 25 are movable together along the vertical direction VD and the connecting direction CD with the cam followers 28, 44 engaged. Wires 45 are connected with the female terminal fittings 42 inserted into the housing 41 and are drawn out downwardly through the bottom surface of the housing 41. The wires 45 then are bent to extend substantially horizontally extend in the wire cover 43 and drawn out of the wire cover 43.

A mounting portion 46 is formed on the rear surface of the wire cover 43. The mounting portion 46 has an L-shaped bracket 47 that can be fixed to the body B. The mounting portion 46 is movable in forward and backward directions FBD with respect to the bracket 47. The mounting portion 46 and the bracket 47 enable the waiting-side connector 40 to be mounted on the body B with a connecting surface 40CS thereof facing up toward the corresponding connecting surface 20CS of the moving-side connector 20. Thus, the connecting surface 20CS of the moving-side connector 20 and the connecting surface 40CS of the waiting-side connector 40 are substantially opposed to each other and face each other substantially along the connecting direction CD.

The guides 11 of the module M are engaged with the rear horizontal guide portions 13 of the guide rails 12 before connecting the two connectors 20, 40. The male terminal fittings 23 and the wire cover 24 then are assembled with the housing 21 in the moving-side connector 20, and the housing 21 is moved down with respect to the frame 33. As a result, the cam followers 28 of the moving plate 25 enter the cam grooves 31 of the levers 29. On the other hand, the female terminal fittings 42 and the wire cover 43 are assembled with the housing 41 of the waiting-side connector 40 and the mounting portion 46 of the waiting-side connector 40 is assembled with the bracket 47 on the body B (see FIGS. 2 to 5). In this state, the waiting-side connector 40 is movable forward substantially along the forward and backward direction FBD with respect to the bracket 47.

Figure 7A:
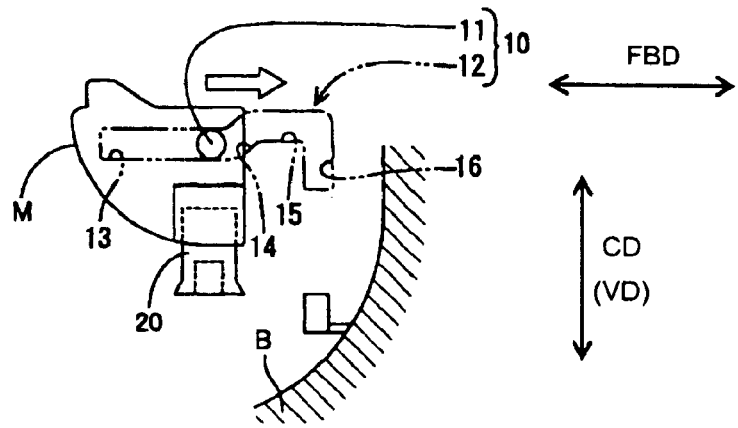
FIG. 7(a) is a schematic side view showing a state where the module and the moving-side connector are located behind the waiting-side connector.
Figure 7B:
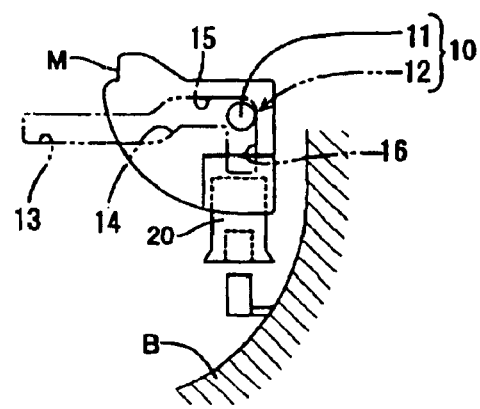
FIG. 7(b) is a schematic side view showing a state where the moving-side connector is located at the position right above the waiting-side connector.
Figure 7C:
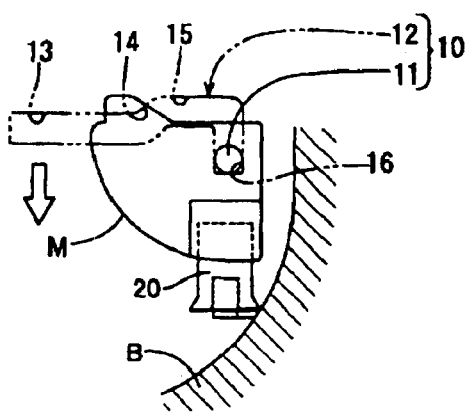
FIG. 7(c) is a schematic side view showing a state where the moving-side connector is connected with the waiting-side connector as the module is moved downward.
Figure 8:
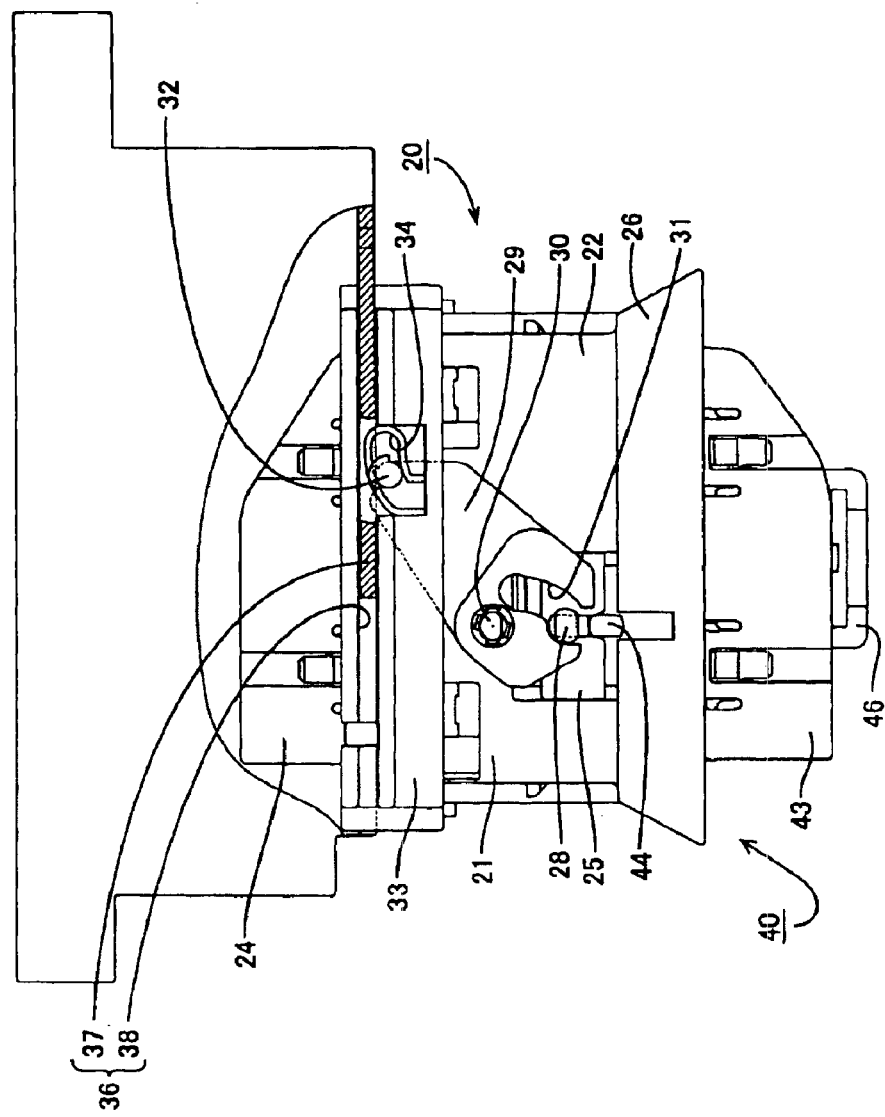
FIG. 8 is a front view partly in section showing a state where the connection of the moving-side connector with the waiting-side connector is started.
Figure 9:
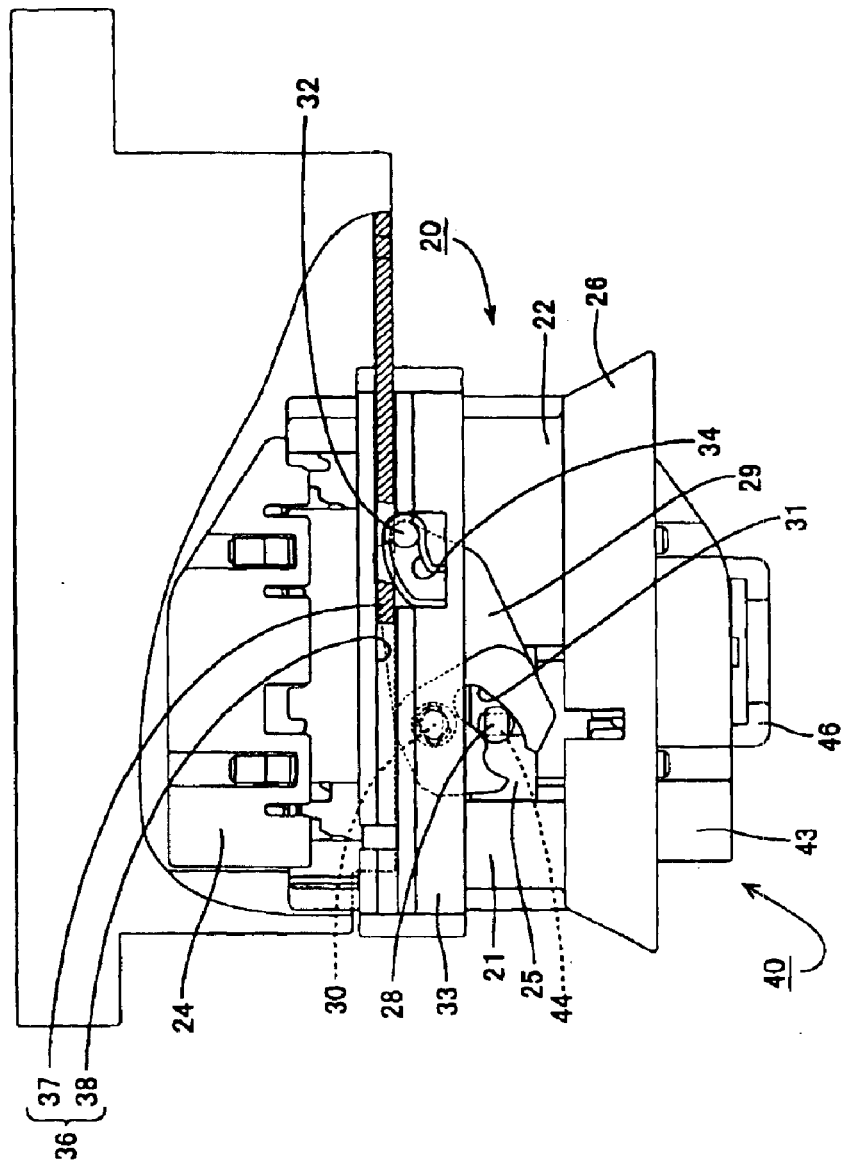
FIG. 9 is a front view partly in section showing an intermediate stage of connection of the moving-side connector and the waiting-side connector.
Figure 10:
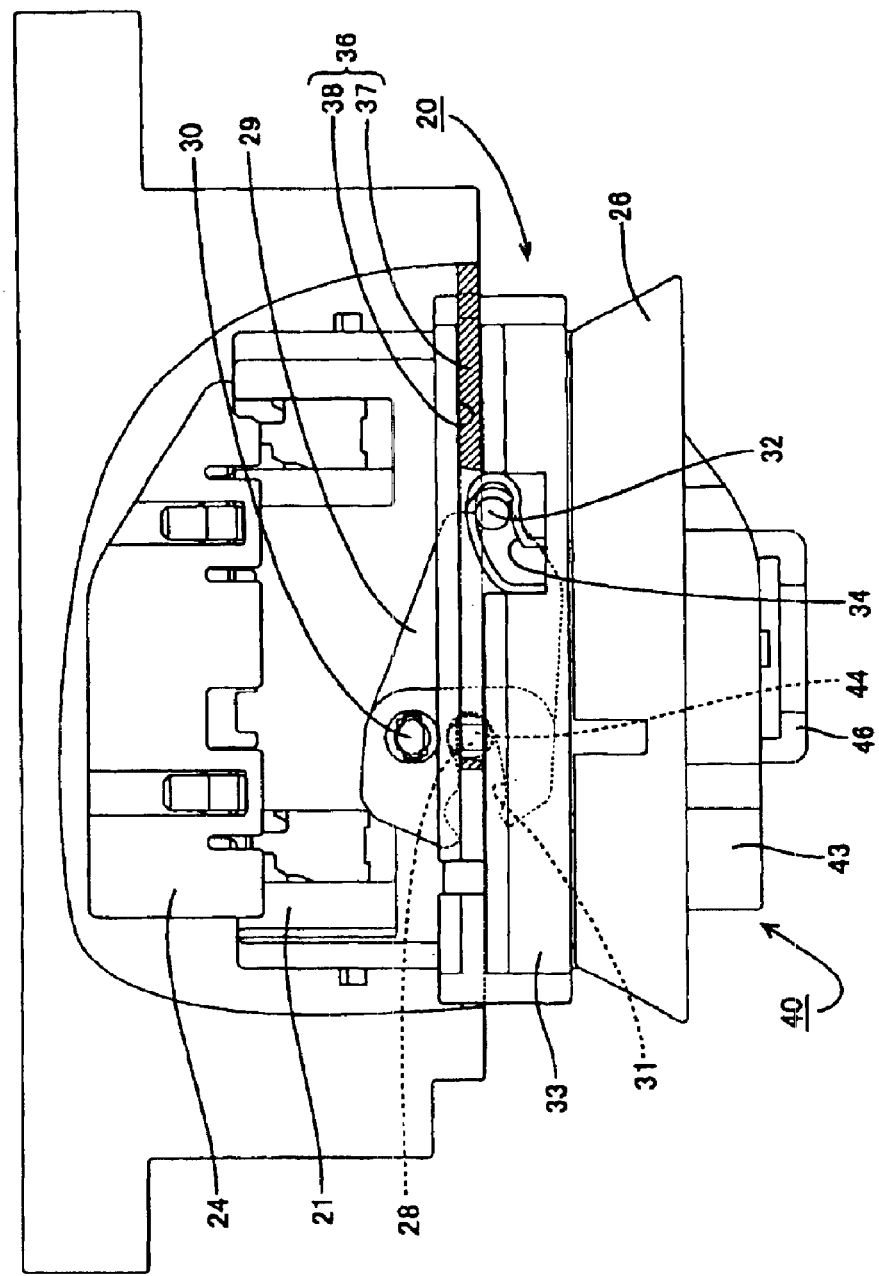
FIG. 10 is a front view partly in section showing a state where the connection of the moving-side connector and the waiting-side connector is completed and the module is relatively displaced leftward from the position shown in FIG. 9.

The module M then is pushed forward toward the body B along the forward and backward direction FBD. These forward pushing forces move the module M along the rear horizontal guide portions 13, as shown in FIG. 7(a). The forward pushing forces then move the module M obliquely up to the front along the slanted guide portions 14, and then horizontally along the front horizontal guide portions 15. The moving-side connector 20 reaches a position above the waiting-side connector 40 and aligned with the waiting-side connector 40 along the connecting direction CD when the guides 11 reach the front ends of the front horizontal guide portions 15 (see FIG. 7(b)). The module M then moves down along the downward guide portions 16 in the connecting direction CD by the action of gravity and hence the module M approaches the waiting side connector 40 (see FIG. 7(c)). The moving-side connector 20 connects with the waiting-side connector 40 as the module M moves down.

The two connectors 20, 40 are connected by fitting the receptacle 22 on the waiting-side connector 40 from above and substantially along the connecting direction CD as the moving-side connector 20 moves down. At this time, the moving-side connector 20 could be displaced from the waiting-side connector 40 forward, back, left and/or right in a direction intersecting the connecting direction CD. However, the slanted inner surface of the guiding portion 26 contacts the outer peripheral edge of the upper end surface of the housing 41 of the waiting-side connector 40. As the connection progresses, the moving-side connector 20 and the module M are displaced horizontally in a direction intersecting the connecting direction CD due to the inclination of the guiding portion 26. Thus, the moving side connector 20 is corrected to a substantially proper position with respect to the waiting-side connector 40 and the body B.

The cam followers 28 of the moving plate 25 unite with the cam followers 44 of the waiting-side connector 40 when the connection of the receptacle 22 with the waiting-side connector 40 is started. Thereafter, when a connection resistance is created between the two connectors 20, 40 to displace the moving-side connector 20 up along the connecting direction CD with respect to the frame 33, the levers 29 are rotated by the engagement of the cam grooves 34 of the frame 33 and the cam followers 32 of the levers 29. Thus, the moving-side connector 20 and the frame 33 are pulled down along the connecting direction CD toward the waiting-side connector 40 by the engagement of the cam grooves 31 and the cam followers 28, 44 and the cam action resulting from the rotation of the levers 29.

After the two connectors 20, 40 reach their properly connected state (see FIG. 4), the two connectors 20, 40 and the module M are moved horizontally forward in the direction FBD (leftward in FIGS. 5 and 6) as an integral unit with respect to the body B. This movement brings the module M to a proper assembling position with the body B. The movement of the two connectors 20, 40 and the module M forward slides the mounting portion 46 of the wire cover 43 of the waiting-side connector 40 along the bracket 47.

As described above, the moving-side connector 20 is connected with the waiting-side connector 40 as the module M is displaced down along the connecting direction CD. Thus, the weight of the module M acts as a force for advancing the connecting operation of the two connectors 20, 40. Even a large connection resistance between the connectors 20, 40 can be overcome easily to assemble the module M with the body B and to connect the two connectors 20, 40. Therefore, operability is good even if the module M is moved manually.

The floating mechanism 36 enables the moving-side connector 20 to be displaced with respect to the module M in a horizontal direction intersecting the connecting direction CD of the two connectors 20, 40. Thus, the connectors 20, 40 can be connected easily despite an initial misalignment.

The guiding portion 26 is slanted and widens at the opening edge of the receptacle 22 of the moving-side connector 20. Thus, a displacement of the moving-side connector 20 in a direction intersecting the connecting direction CD with respect to the waiting-side connector 40 is corrected automatically by the slanted guiding portion 26 as the connection progresses, and the two connectors 20, 40 can be connected without any hindrance. Accordingly, it is not necessary to manually correct the position of the connector.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

The moving-side connector of the module is a male connector and the waiting-side connector of the body is a female connector in the foregoing embodiment. However, the module-side connector may be a female connector and the body-side connector may be a male connector.

Although the connectors are connected by levers in the foregoing embodiment, the levers may not be used according to the present invention.

The moving-side connector has a displacement correcting means comprised of the floating mechanism and the slanted guiding portion in the foregoing embodiment. However, the displacement correcting means may be only in the waiting-side connector or in both the moving-side connector and the waiting-side connector according to the present invention.

The floating mechanism and the slanted guide are both in the moving-side connector in the foregoing embodiment as the displacement correcting means. However, one of the floating mechanism and the guide may be in the moving-side connector and the other may be in the waiting-side connector.

The lever is described as being pivotable or rotatable. However, a substantially linearly or otherwise displaceable movable member that displays a cam action can be used according to the invention.

The movable plate of the moving side connector may be omitted according to the invention.

The connecting direction CD preferably is substantially vertical so that a force of gravity can act on the moving-side connector 20 to connect more easily with the waiting-side connector 40. However, the connecting direction may be inclined slightly with respect to the vertical direction (e.g. by an angle of about +/−20°, more preferably by an angle of about +/−10°, most preferably by an angle of about +/−5°) so that a force component of gravity along the connecting direction can still assist the connection of the two connectors 20, 40. Accordingly, the connecting surfaces 20CS and 40CS may be inclined by a similar angle.

What is claimed is:

1. A connector assembling construction for connecting a moving-side connector on a module and a waiting-side connector on a body as the module is assembled with the body, wherein:
   the moving-side connector is mounted on the module with a connecting surface thereof having a normal vector inclined by less than about 20° with respect to a vertical direction,
   the waiting-side connector is mounted on the body with a connecting surface thereof having its normal vector inclined by less than about 20° with respect to the vertical direction, and
   the module is displaced along a connecting direction to connect the moving-side connector with the waiting-side connector, and wherein one of the moving-side connector and the waiting-side connector has a floating mechanism for enabling the respective connector to be displaced with respect to one of the module and the body in a direction intersecting the connecting direction of the two connectors.

2. The connector assembling construction of claim 1, wherein a guiding means is provided to guide the module to be assembled with the body by being moved substantially horizontally and then displaced down.

3. The connector assembling construction of claim 1, wherein one of the moving-side connector and the waiting-side connector includes a receptacle into which the other connector is fittable, and a guiding portion slanted to be widened is formed at an opening edge of the receptacle.

4. The connector assembling construction of claim 1, wherein a cam means is provided for assisting the connection of the moving-side connector and the waiting-side connector.

5. A connector assembling construction for connecting a moving-side connector to a waiting-side connector as a module is assembled with a body, comprising:
   means for mounting the waiting-side connector to the body with a connecting surface of the waiting-side connector facing up;
   means for mounting the moving-side connector to the module with a connecting surface of the moving-side connector facing down;
   means for moving the module into a position where the connecting surface of the moving-side connector is substantially opposed to and above the connecting surface of the waiting-side connector;
   means for guiding the module down along a connecting direction toward the body with assistance of gravity;
   floating means for floating at least one of said moving-side connector and said waiting-side connector in at least one direction substantially transverse to the connecting direction for aligning the connecting surface of the moving-side connector with the connecting surface of the waiting-side connector so that movement of the module substantially along the connecting direction towards the body connects the moving-side connector to the waiting-side connector.

6. An assembling method for connecting a moving-side connector in a module and a waiting-side connector on a body as the module is assembled with the body, comprising the following steps:
   mounting the moving-side connector on the module with a connecting surface thereof having a normal vector inclined by less than about 20° with respect to a vertical direction;
   mounting the waiting-side connector on the body with a connecting surface thereof having a normal vector inclined by less than about 20° with respect to the vertical direction;
   displacing the module along a connecting direction to connect the moving-side connector with the waiting-side connector; and
   allowing at least one of the moving-side connector and the waiting-side connector to float with respect to the module or the body in a direction intersecting the connecting direction of the two connectors.

7. The assembling method of claim 6, further comprising a step of guiding the module substantially horizontally and then down.

8. The assembling method of claim 6, wherein one of the moving-side connector and the waiting-side connector includes a receptacle into which the other connector is fittable, and a guiding portion slanted to be widened in proximity to an opening edge of the receptacle.

9. The assembling method of claim 6, further comprising assisting the connection of the moving-side connector and the waiting-side connector by a cam action.

10. An assembling method for connecting a moving-side connector on a module and a waiting-side connector on a body as the module is assembled with the body, comprising:

mounting the waiting-side connector on the body with a connecting surface thereof facing substantially up; and mounting the moving-side connector on the module with a connecting surface facing down;

displacing the module into a position where the connecting surface of the moving-side connector is opposed to the connecting surface of the waiting side connector;

guiding the module down along a connecting direction toward the body with assistance of gravity; and floating at least one of the moving-side connector and the waiting-side connector in at least one direction transverse to the connecting direction for aligning the moving-side connector to the waiting-side connector, such that said moving-side connector connects with the waiting-side connector as the module is assembled down onto the body.

* * * * *